(12) United States Patent
Morris et al.

(10) Patent No.: US 7,046,916 B1
(45) Date of Patent: May 16, 2006

(54) ENCODED VIDEO IMAGE FORMATTING

(75) Inventors: Octavius J. Morris, Redhill (GB); Timothy J. Everett, Thareham (GB)

(73) Assignee: Koninklijke Philips Electronics N.V., Eindhoven (NL)

( * ) Notice: Subject to any disclaimer, the term of this patent is extended or adjusted under 35 U.S.C. 154(b) by 745 days.

(21) Appl. No.: 09/172,435

(22) Filed: Oct. 14, 1998

(30) Foreign Application Priority Data

Oct. 14, 1997 (GB) ................... 9721662

(51) Int. Cl.
*H04N 7/26* (2006.01)
(52) U.S. Cl. ................... 386/111; 386/33; 386/45; 386/68; 386/82; 386/112; 386/125; 386/126
(58) Field of Classification Search ................... 386/33, 386/45, 68, 82, 111–112, 125–126
See application file for complete search history.

(56) References Cited

U.S. PATENT DOCUMENTS

| | | | | | |
|---|---|---|---|---|---|
| 5,136,395 | A | * | 8/1992 | Ishii et al. | 386/68 |
| 5,249,053 | A | * | 9/1993 | Jain | 348/231 |
| 5,504,585 | A | * | 4/1996 | Fujinami et al. | 386/111 |
| 5,568,274 | A | * | 10/1996 | Fujinami et al. | 386/107 |
| 5,621,840 | A | * | 4/1997 | Kawamura et al. | 386/68 |
| 5,768,466 | A | * | 6/1998 | Kawamura et al. | 386/69 |
| 5,838,872 | A | * | 11/1998 | Kawara | 386/68 |
| 6,016,382 | A | * | 1/2000 | Yamagishi et al. | 386/109 |
| 6,078,722 | A | * | 6/2000 | Kawamura et al. | 386/68 |
| 6,118,928 | A | * | 9/2000 | Kawakami et al. | 386/109 |
| 6,141,491 | A | * | 10/2000 | Yamagishi et al. | 386/109 |

FOREIGN PATENT DOCUMENTS

| | | |
|---|---|---|
| EP | 0606857 A2 | 7/1994 |
| EP | 0632653 A2 | 1/1995 |
| EP | 0660606 A1 | 6/1995 |
| GB | 2308264 A | 6/1997 |

* cited by examiner

*Primary Examiner*—James J. Groody
*Assistant Examiner*—Helen Shibru
(74) *Attorney, Agent, or Firm*—Michael E. Belk

(57) ABSTRACT

A method and apparatus are provided to enable variable speed forwards or reverse play of motion-prediction coded sequences of video signal frames. Successive images of a sequence are MPEG encoded with some images of the sequence becoming I-frames and the remainder P- or B-frames. The frame data is formatted to sequences of fixed size data blocks (I,P,B) to form a data block stream into which further, information blocks (i) are inserted at periodic intervals. Each information block (i) carriers a pointer to the relative location in the data block stream of the first data block of the immediately preceding I-frame.

19 Claims, 2 Drawing Sheets

ENCODED VIDEO IMAGE FORMATTING

BACKGROUND OF THE INVENTION

The present invention relates to the formatting of predictive-encoded digital video signals for storage on a recording medium, especially but not exclusively an optical or magnetic disc, as well as to storage media carrying the particularly formatted signals, and encoding and decoding apparatus supporting the particular signal format.

With reference to predictive encoding, we are principally concerned with the MPEG coding schemes as defined in ISO 11172 (MPEG-1) and ISO 13818 (MPEG-2), although it will be recognised that it is applicable to other coding schemes, particularly motion-compensated and hybrid-DCT (discrete cosine transformation) based coding schemes, such as the H.261 and H.263 standards for video-telephony. MPEG and H.261 are digital coding systems conventionally used for storing and compressing natural picture sequences, with the decoders being designed to interpret such encoded data and reproduce the same original sequence of images.

The MPEG standard recognises three types of pictures (frames) namely intra-pictures, predicted pictures and interpolated pictures, generally referred to as I-, P-, and B-pictures respectively. A typical MPEG picture sequence is shown in FIG. 1 of the accompanying drawings. I-pictures are specifically intended to provide access points for random pictures and as such they are coded complete, with only limited compression. P-pictures are coded with reference to a past (I or P) picture and often form a reference for future P-pictures. B-pictures have the highest degree of compression but require both a past and future reference for their generation.

MPEG compressed video stored on an optical or magnetic disc (CD, DVD, DVD-RAM, hard-disk etc.) or other linearly-read digital storage means may be seen as a replacement for analog video storage systems such as video tape and laser disc. One of the known problems with using predictively coded video is how to implement the so-called trick modes that users take for granted (fast-forward and reverse play being the best known examples). As it is not generally possible to speed up or reverse the conventional display process, it becomes necessary to skip through the encoded data, at the same time seeking suitable access points: in the FIG. 1 example, it is only possible to start decompressing the video data stream at the points indicated, where the I-frames do not rely on contributions from prior to the access point.

The step of locating these access points brings another problem, in that the compressed frames in the sequence are of varying lengths and hence the procedure involves more than simply counting bits from the start of a previous frame. Some systems solve the problem by introducing data into the video stream with pointers to future access points (as I-frames are indicated in DVD-Video). One example of such a system is described in GB-A-2308264 where an MPEG disk for high-speed reproduction contains position information for successive I-frames in a recording area of a first I-frame. The problem with this approach is that a second pass is needed to fill in these pointers. This makes real-time recording (one pass as with conventional VCR) impossible.

SUMMARY OF THE INVENTION

It is therefore an object of the present invention to provide a means whereby predictively-encoded digital video signals may be decompressed in one or various trick-play modes.

In accordance with a first aspect of the present invention there is provided a method for formatting a sequence of video images comprising the steps of: encoding successive images of the sequence according to a predetermined coding scheme in which some images of the sequence are intra-coded, without reference to any other image of the sequence, and the remainder are respectively coded with reference to at least one further image of the sequence; formatting the encoded data for each image frame into one or a sequence of data blocks and outputting a data block stream formed of the data block or blocks from successive ones of the sequence of video images; characterised in that the step of formatting comprises the further steps of identifying intra-coded frames and of inserting additional data blocks in said data block stream, each of said additional blocks carrying data identifying the relative location in the data block stream of the first or only data block of an intra-coded image frame.

Preferably, a single additional data block (also referred to herein as an information block) is inserted in the data block stream at fixed periodically repeated intervals, such as for example every 25th data block of the stream; where the data blocks are all of a common size, skipping from one information block to another becomes a relatively simple matter. Each additional data block may store data identifying the first or only data block in the data block stream of the closest previously formatted intra-coded image frame, and may also store further data identifying the length of the said closest previously formatted intra-coded image frame. As above, the image frames may be encoded in accordance with MPEG standards, or another predictive coding scheme may be employed.

Also in accordance with the present invention there is provided a sequentially-readable storage device carrying an encoded and formatted sequence of video image frames wherein some images of the sequence are intra-coded, without reference to any other image of the sequence, and the remainder are respectively coded with reference to at least one further image of the sequence, and the encoded data for the succession of image frames is formatted into a sequence of fixed size data blocks, with at least one data block per encoded image frame, with the stored sequence of data blocks including additional data blocks, with each such additional data block identifying the storage device storage location of the first or only data block of an intra-coded image frame.

Within the storage device, the said additional data blocks are suitably provided at fixed periodically repeated intervals within the stored sequence of encoded image data blocks, with each said additional data block containing data identifying the storage device storage location of the first or only data block of the closest previously formatted intra-coded image frame. Where the storage device is an optical disc, the said additional data blocks may identify the location of the first or only data block of the closest preceding intra-coded image frame in terms of the location on disc at which said data block is stored.

Where the storage device carries at respective separate storage locations auxiliary data associated with respective encoded image frames, for example subtitling data, each said additional data block may further carry data identifying the storage device storage location of the auxiliary data associated with the particularly indicated intra-coded image frame. In this way, the auxiliary data may be included in the trick-play.

Further in accordance with the present invention there is provided an encoder apparatus operable to implement the formatting method set forth above, the apparatus comprising means for encoding successive images of a video image sequence according to a predetermined coding scheme in which some images of the sequence are intra-coded, without reference to any other image of the sequence, and the remainder are respectively coded with reference to at least one further image of the sequence; means for formatting the encoded data for each image frame into one or a sequence of fixed size data blocks and outputting a data block stream formed of the data block or blocks from successive ones of the sequence of video images, said means for formatting being operable to identify intra-coded frames, and being configured to insert additional data blocks in said data block stream, each of said additional blocks carrying data identifying the relative location in the data block stream of the first or only data block of an intra-coded image frame.

Still further in accordance with the present invention there is provided a video image player configured to receive and read the sequence of data blocks from a sequentially-readable storage device as set forth above, said player comprising a decoder arranged to receive the stream of data blocks, decode the image data and output a sequence of video image frames, said player being operable to output selected ones of said sequence in a fast-forward or fast reverse mode, the player comprising means for selecting frames by selecting every $N^{th}$ additional data block and displaying the respectively identified intra-coded image frame.

BRIEF DESCRIPTION OF THE DRAWINGS

Further features and advantages of the present invention will become apparent from reading of the following description of preferred embodiments of the invention, given in terms of MPEG compressed video by way of example only, with reference to the accompanying drawings in which.

DETAILED DESCRIPTION OF THE PREFERRED EMBODIMENTS

Figure 1:
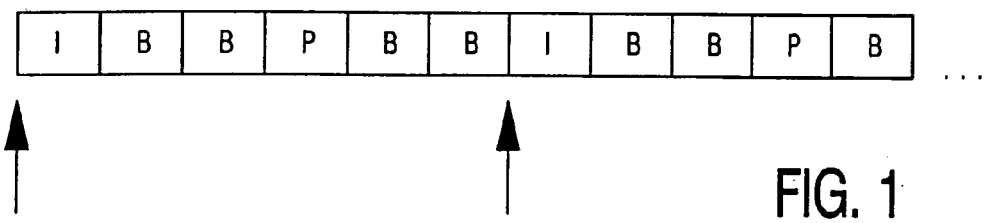
FIG. 1 schematically represents a conventional video frame sequence according to MPEG standards.

The method for formatting starts with the encoding of successive images of the sequence as MPEG I-, B-, or P-frames to generate a sequence of encoded frames such as that of FIG. 1. Note that fields rather than frames may be the basic encoded entity, although the technique is unchanged: the following example refers just to frames although the skilled reader will recognise that this is not intended as in any way limiting. The formatting operation itself divides the encoded data for each image frame into one, or more usually several, data blocks which would conventionally be output in sequence as a data block stream. For convenience of handling, these data blocks are chosen to be of a common size, although this is not a prerequisite to successful operation.

In order to enable I-frames to be rapidly located, and thus enable trick-modes, additional data blocks (information blocks) are inserted at regular intervals in the data block stream, for example at every 25th or 30th block. The encoded video is embedded within a multiplexed steam when recorded to disc, with the information blocks being classed as "private" data such that a demultiplexer will generally ignore them and thus avoid disturbing the MPEG sequence. Each of these information blocks carries data identifying the starting location (and preferably also length) of the previous I-frame as it appears in the data block stream.

To implement fast-forward through the video frames, a suitably configured player will seek to an arbitrary information block and, using the data therein, locate the preceding I-frame and decode it. Depending on the speed of fast-forward, the player then skips to the next (or Nth) information block and repeats the process, thus skipping through the video stream at an increased speed. The speed of viewing depends on the number of information blocks skipped as, although the compressed video frames are of variable length, the overall compressed bit rate remains approximately constant.

Figure 2:
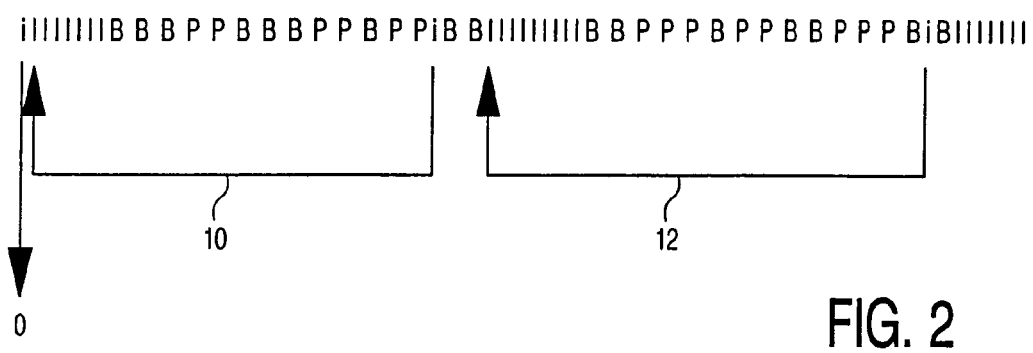
FIG. 2 represents an MPEG frame sequence formatted as a data block sequence according to the invention.

FIG. 2 represents the data block sequence for a video image sequence compressed as:

IBPBPBPBIBPBPBPBI

Each of the letters appearing in the sequence in FIG. 2 represents one data block on the storage medium: as can be seen, the I-frames (being coded complete) require the greatest number of data blocks for recording. As also shown, the sequence is interrupted every 25th block by the inclusion of an information block (represented by i) with arrows 10,12 representing how the information block identifies the first data block of the immediately preceding I-frame.

Figure 3:
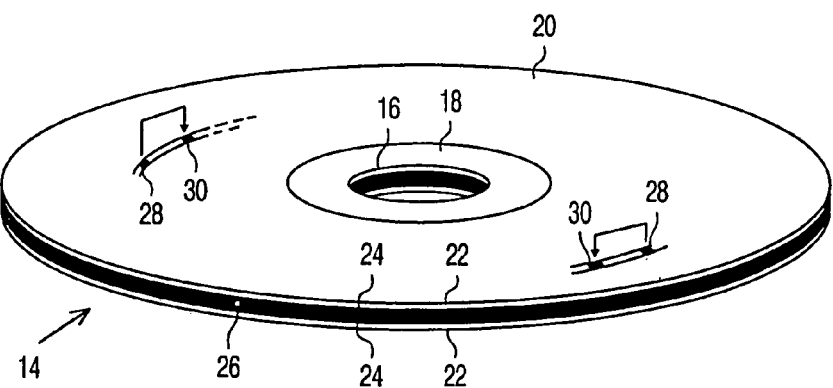
FIG. 3 shows an optical disc holding frame sequences such as that of FIG. 2.

FIG. 3 represents a sequentially-readable storage device, in the form of a DVD disc 14, carrying the encoded and formatted sequence of video image frames. The disc has the conventional centre hole 16 and clamping area 18 surrounded by a pair of read-out surfaces 20 provided by respective transparent substrates 22 over recorded layers 24, with the upper and lower layers being separated by an adhesive layer 26. As schematically shown, within the recorded tracks, the periodically spaced information blocks 28 contain the location of the start of the preceding I-frame 30.

Figure 4:
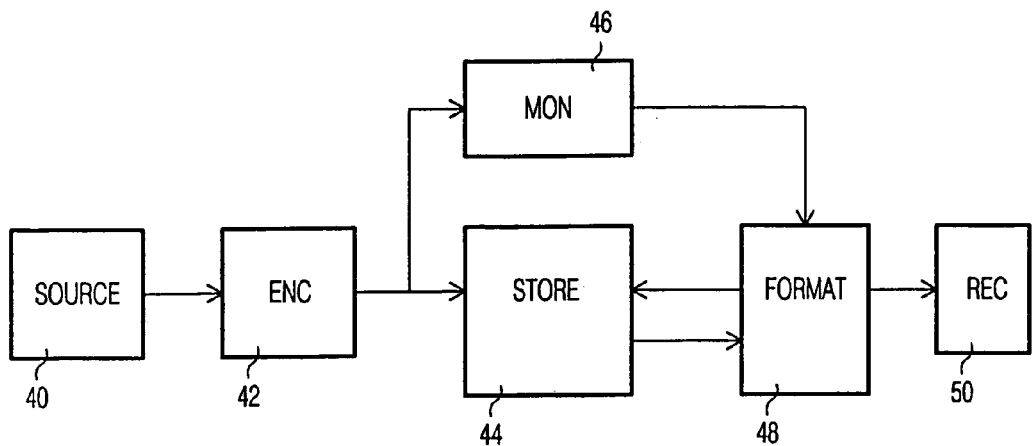
FIG. 4 is a block schematic drawing of an encoder apparatus embodying the present invention.

FIG. 4 schematically represents an encoding and formatting apparatus operable to generate the streams of data blocks such as that in FIG. 2. From an image data source 40 an MPEG encoder 42 generates the compressed I-, P-, and B-frame data and outputs it to frame data store 44. As the data is read into the frame data store, it is also passed to a monitoring stage 46 which detects I-frames. Coupled to read the data out of the frame data store 44 is formatting stage 48 which forms the sequential stream of data blocks: the formatting stage is also coupled to receive indication of I-frames from the monitoring stage 46 and, based on this information, it generates the periodic information frames and inserts them in the output block stream to a storage apparatus write/recording stage 50.

Figure 5:
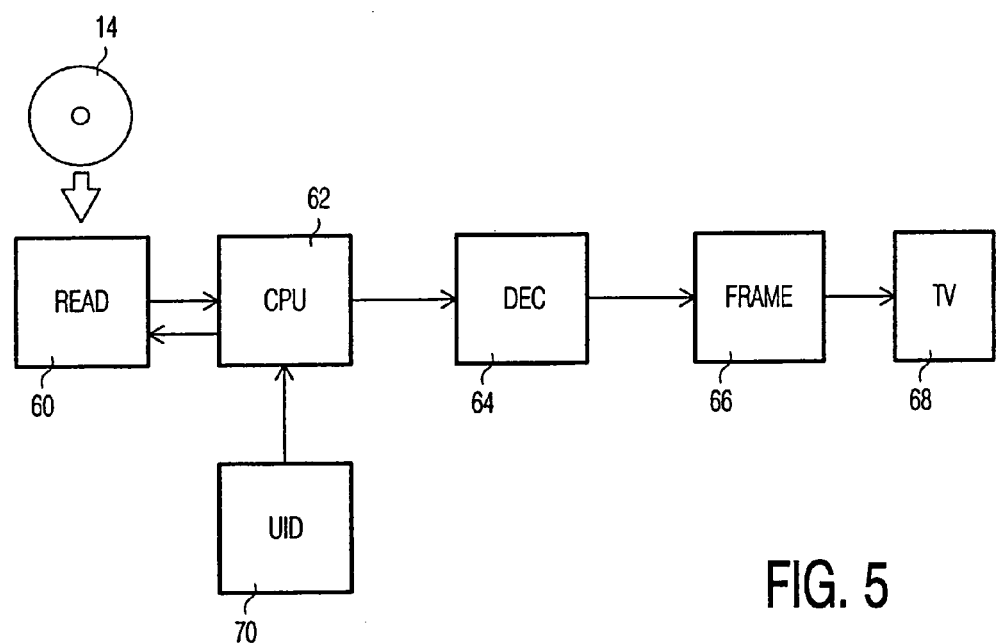
FIG. 5 is a block schematic diagram of a decoder apparatus embodying the present invention.

FIG. 5 schematically represents a video image player configured to receive and read the sequence of data blocks, including information blocks, from a suitable sequentially-readable storage device such as the disc of FIG. 3. The player comprises a disc reader 60 operating under control of a CPU 62 to read data from disc 14 to decoder stage 64 (via the CPU). In the decoder stage 64, coupled with a frame store 66, the video image sequence is recreated in the frame store before being output to a display, such as a television 68.

User input means 70 are coupled with the player CPU 62 and include controls for initiating the various trick-modes supported: as will be well understood, these controls may be provided on the player itself or on a remote control handset coupled by infra-red link. On entering a trick-mode, such as fast-forward, the CPU directs the decoder 64 to skip frames by selecting every $N^{th}$ additional data block and displaying just the respectively identified I-frame. In a domestic appliance, the value of N may be fixed (constant fast-forward/reverse rate): in professional/studio apparatus, however, it may be variable in response to user input.

Whilst shown in FIGS. 4 and 5 as hardware devices, it will be understood that the encoding and decoding procedures may be carried out off-line wholly or partially in a software implementation.

From reading the present disclosure, other modifications will be apparent to persons skilled in the art. Such modifications may involve other features which are already known in the design, manufacture and use of video signal encoding and decoding systems and devices and component parts thereof and which may be used instead of or in addition to features already described herein. Although claims have been formulated in this application to particular combinations of features, it should be understood that the scope of the disclosure in the present application also includes any novel feature or any novel combination of features disclosed herein either explicitly or implicitly or any generalisation thereof, whether or not it relates to the same invention as presently claimed in any claim and whether or not it mitigates any or all of the same technical problems as does the present invention. The applicants hereby give notice that new claims may be formulated to such features and/or =combinations of such features during the prosecution of the present application or of any further application derived therefrom.

The invention claimed is:

1. A method for formatting a sequence of video images comprising the steps of:
   encoding successive images of the sequence according to a predetermined coding scheme in which some images of the sequence are intra-coded, without reference to any other image of the sequence, and the remainder are respectively coded with reference to at least one further images of the sequence;
   formatting the encoded data for each image into one or a sequence of data blocks and outputting a data block stream formed of the data block or blocks from successive ones of the sequence of video images, said formatting including formatting at least one image of the sequence into a plurality of data blocks;
   characterised in that the step of formatting comprises the further steps of identifying intra-coded frames and of inserting additional data blocks in said data block stream at fixed periodically repeated intervals, each of said additional data blocks carrying data identifying the relative location in the block stream of the first only data block in the data block stream of the closest previously formatted intra-coded image frame.

2. A method as claimed in claim 1, wherein each additional data block stores further data identifying the length of the said previously formatted intra-coded image size.

3. A method as claimed in claim 1, wherein the image frames are encoded in accordance with MPEG standards and all data blocks in the data block stream are of a common size.

4. A method as claimed in claim 1, wherein at least one image of the sequence includes an intra-coded image frame.

5. A method as claimed in claim 1, wherein at least one image of the sequence includes a predicted image frame (P-frame).

6. A method as claimed in claim 1, wherein at least one image of the sequence includes an interpolated image frame (B-frame).

7. A method as claimed in claim 1, wherein said encoding comprises encoding at a variable compression rate.

8. A storage device capable of being sequential read and carrying an encoded and formatted sequence of video image frames, wherein some images of the sequence are intra-coded, without reference to any other image of the sequence, and the remainder are respectively coded with reference to at least one further image of the sequence, and the encoded data for the succession of image frames is formatted into a sequence of data blocks, with at least one data block per encoded image frame, with at least one image of the sequence formatted into a plurality of data blocks, with the stored sequence of data blocks including additional data blocks, with each such additional data block identifying the storage device location of the first or only data block of the closest previously formatted intra-coded image frame; wherein the said additional data blocks are provided at fixed periodically repeated intervals within the stored sequence of encoded image data blocks.

9. A storage device as claimed in claim 8, wherein the said additional data blocks are of a common size.

10. A storage device as claimed in claim 8, carrying at respective separate storage locations auxiliary data associated with respective encoded image frames and each said additional data block further carries data identifying the storage device storage location of the auxiliary data associated with the particularly indicated intra-coded image frame.

11. A storage device as claimed in claim 8, in the form of an optical disc, wherein the said additional data blocks identify the location of the first or only data block of the closest preceding intra-coded image frame in terms of the location on disc at which said data block is stored.

12. A device as claimed in claim 8, wherein at least one image of the sequence includes an intra-coded image frame.

13. A device as claimed in claim 8, wherein at least one image of the sequence includes a predicted image frame (P-frame).

14. A as device claimed in claim 8, wherein at least one image of the sequence includes an interpolated image frame (B-frame).

15. An encoder apparatus comprising means for encoding successive images of a video image sequence according to a predetermined coding scheme in which some images of the sequence are intra-coded, without reference to any other image of the sequence, and the remainder are respectively coded with reference to at least one further image of the sequence; means for formatting the encoded data for each image frame into one or a sequence of data blocks and outputting a data block stream formed of the data block or blocks from successive ones of the sequence of video images, said formatting including formatting at least one image of the sequence into a plurality of data blocks, said means for formatting being operable to identify intra-coded frames, and being configured to insert additional data blocks in said data block stream, each of said additional data blocks carrying data identifying the relative location in the data block stream of the first or only data block of the closest previously formatted intra-coded image frame, wherein each of said additional data blocks are provided at fixed periodically repeated intervals within the stored sequence or encoded image data blocks.

16. An apparatus as claimed in claim 15, wherein at least one image of the sequence includes an intra-coded image frame.

17. An apparatus as claimed in claim 15, wherein at least one image of the sequence includes a predicted image frame (P-frame).

18. An apparatus as claimed in claim 15, wherein at least one image of the sequence includes an interpolated image frame (B-frame).

19. A video image player configured to receive and read the sequence of data blocks from a sequentially-readable storage device, said storage device capable of being sequential read and carrying an encoded and formatted sequence of video image, wherein some images of the sequence are intra-coded, without reference to any other image of the sequence, and the remainder are respectively coded with reference to at least one further image of the sequence, and the encoded data for the succession of image frames is formatted into a sequence of data blocks, with at least one data block per encoded image frame, with at least one image of the sequence formatted into a plurality of data blocks, with the stored sequence of data blocks including additional data blocks, with each such additional data block identifying the storage device storage location of the first or only data block of the closest previously formatted intra-coded image frame, said player comprising a decoder arranged to receive the stream of data blocks, decode the image data and output a sequence of video image frames, said player being operable to output selected ones of said sequence in a fast-forward or fast reverse mode, the player comprising means for selecting frames by selecting every $N^{th}$ additional data block and displaying the respectively identified intra-coded image frame, wherein every $N^{th}$ additional data block is provided at fixed periodically repeated intervals.

* * * * *